2 Sheets—Sheet 1.
J. L. BRANSON.
KNITTING MACHINE.
No. 10,271. Reissued Jan. 16, 1883.
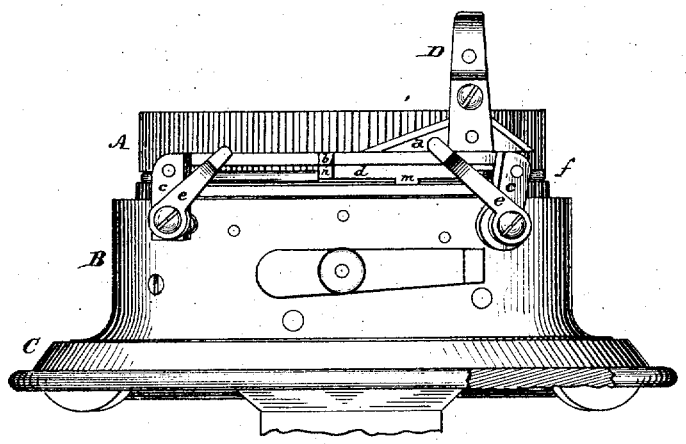
Fig. 1
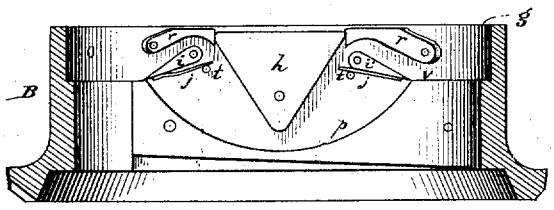
Fig. 2
Fig. 3
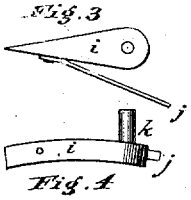
Fig. 4
Witnesses
Eugene C. Clarke
Wm. H. Carson
Inventor
James L. Branson,
by his Attorney,
Joshua Pusey.

J. L. BRANSON.

KNITTING MACHINE.

No. 10,271. Reissued Jan. 16, 1883.

Witnesses

Eugene S. Clarke

Wm. H. Carson.

Inventor

James L. Branson, by his Attorney,

Joshua Pusey.

UNITED STATES PATENT OFFICE.

JAMES L. BRANSON, OF PHILADELPHIA, PENNSYLVANIA.

KNITTING-MACHINE.

SPECIFICATION forming part of Reissued Letters Patent No. 10,271, dated January 16, 1883.

Original No. 149,192, dated March 31, 1874. Application for reissue filed March 26, 1881.

*To all whom it may concern:*

Be it known that I, JAMES L. BRANSON, of the city and county of Philadelphia, and State of Pennsylvania, have invented certain new and useful Improvements in Knitting-Machines, of which the following is a specification, reference being had to the accompanying drawings, in which—

Figure 5:
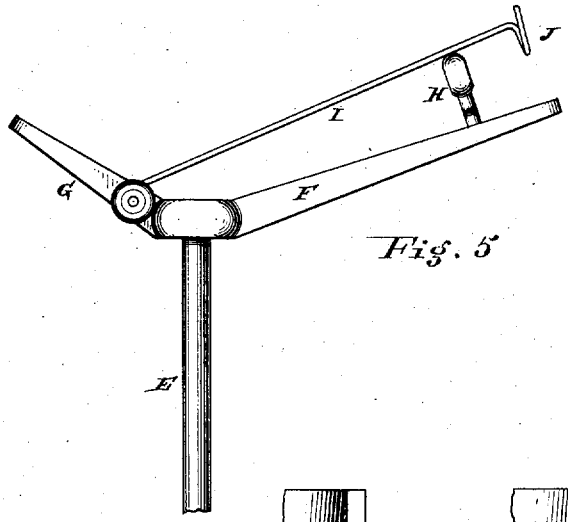
Figure 6:
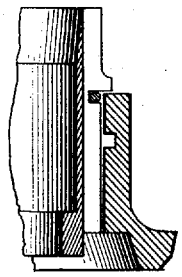
Figure 7:
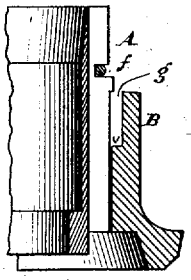
Figure 8:
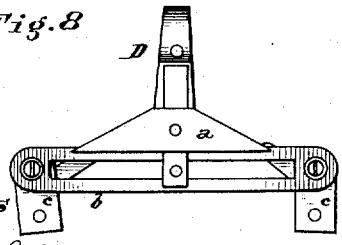
Figure 9:
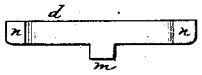
Figure 10:
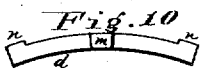
Figure 11:
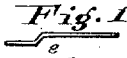

Figure 1 is an elevation; Fig. 2, a vertical section, showing the cams; Figs. 3 and 4, enlarged details of one of the wing-cams; Fig. 5, an elevation of the tension device. Fig. 6 represents the old way of constructing the cam-cylinder. Fig. 7 represents my improvement in the cam-cylinder; Fig. 8, an inside view of the yarn-carrier, latch-protector, and slotted bar; Fig. 9, an elevation of the movable sliding bar by means of which the position of the yarn-carrier is changed; Fig. 10, a bottom view of the same, and Fig. 11 a top view of one of the springs at the end of the slotted bar.

My invention relates to what are called "reciprocating-cylinder knitting-machines;" and it consists in an improved construction of the cam-cylinder used in combination with other devices, and also in combination with a needle-cylinder, with its needles and a retaining-wire, as will be hereinafter specified, and whereby certain advantages are gained, as hereinafter mentioned, and in the combination, with such cam-cylinder, of a sliding bar and other devices for moving the yarn-carrier from one side of the cams to the other when knitting straight fabrics; also, in the several devices and combinations hereinafter claimed.

In the drawings, A represents the needle-cylinder; B, the cam-cylinder, and C the bed-plate.

It has been customary to provide the cam-cylinder with a flange on the inside above the groove which receives the heels of the needles, and to place the wire which encircles the needle-cylinder and supports the needles below the top of the cam-cylinder—that is, in effect, below the top of the cams. When so constructed it is impossible to elevate the needles directly, and it is manifestly impossible to withdraw the needle-cylinder from or to insert it within the cam-cylinder with the needles in the former. This construction is shown in Fig. 6. I cut away all that part of the interior of the cam-cylinder above the shoulder on which the needles rest, so as to form an open recess, as represented at *g*, Fig. 7, and locate the wire *f* above the top of the cam-cylinder, as shown in Figs. 1 and 7. This construction facilitates the insertion and removal of the needles. The wire *f* being located as shown, the needles may be raised directly above the cams; also, the cam-cylinder being open above the ledge *v*, the insertion and removal of the needles is greatly facilitated; and, finally, the operator is enabled to remove the needle-cylinder from the cam-cylinder with all the needles in place and without liability of their falling out. In order to so remove the needle-cylinder, those parts which are in the way must be detached and the cylinder turned, and at the same time lifting a sufficient number of the needles above the cam *h*, so that there will be no needles in the camway—that is, none immediately under cam *h* and pieces *r*, Fig. 2. This flangeless cam-cylinder is a material advantage, as the needle-cylinder, with all the needles therein, may readily be taken out, (with or without the work on the needles,) whereby the machine may the more easily be cleaned and broken parts removed and repairs made without disturbing the needles. There is another economy arising from this improved construction, as follows: When the needle-cylinder, with the needles therein, is removed from the cam-cylinder, and it is desired to examine the needles or necessary to replace one or more new ones for such as are found to be broken or worn out, the circle of needles being held in place by the wire *f*, the operator can take out one needle at a time and reinsert it or another in lieu thereof. Without the retaining-wire located as described, the needles would fall out and be apt to become mingled when the cylinder is lifted out, so that it would be impossible to put back each needle in its particular place. Those who have operated cylinder-machines to much extent are aware of the fact that each needle wears its own bed or makes its "fit," so to say, and that it is important that as little change or exchange as may be should be made in the relative locations of the needles.

D represents the yarn-carrier, which is permanently secured to the protector *a*, the upper edges of which are beveled to prevent the latches from catching. *b* is a slotted bar, having an arm, *c*, at each end, secured to the cam-cylinder. The lower end of the yarn-carrier passes down on the inside of this slotted bar *b*, and is held loosely in place by means of a screw-bolt inserted from the outside, (not shown in Fig. 1,) being behind the spring *e*, which holds the yarn-carrier in place, and from which it can be withdrawn by the use of a little force. The yarn-carrier can be moved from one end of the slotted bar *b* to the other, and it is necessary to do this when knitting straight work as often as the movement of the cylinder is reversed, and this is accomplished as follows: *d* is a sliding bar, having projections *n* upon each end, and a projection, *m*, on the under side. (See Figs. 1, 9, and 10.) The projections *n* are so arranged as to engage with the lower end of the yarn-carrier, and the projection *m* is so arranged as to engage with the heel of one of the raised needles, so that when the cam-cylinder is being rotated, if one of the needles be raised, its heel will, after having passed the yarn-carrier, come in contact with the projection *m* on the bar *d*, holding it until, in the further rotation of the cam-cylinder, one of the projections *n* engages with the lower end of the yarn-carrier D. Then, the cam-cylinder still rotating, the yarn-carrier will be held stationary, and, the cam-cylinder continuing to rotate, the yarn-carrier will, in effect, be drawn out from beneath the spring *e* and carried over to the other end of the slotted bar *b* and beneath the other spring, though, in fact, the opposite end of the slotted bar is brought around to the yarn-carrier, bringing the operating-needles to the proper position. The protector *a* is rigidly attached to the carrier D, and passes down behind the slotted bar *b*, as shown at Fig. 8, and the upper face of the sliding bar *d* rests against it. This holds said bar *d* in position, and prevents it from tipping or binding when a needle-heel strikes against the projection *m*; and as the protector *a* and bar *d* are always over the ledge *p* and the cams, all displacement of the needles is obviated without the use of a ring or other device to cover the space left by cutting away that portion of the cylinder B which is above the ledge *v*.

The construction and arrangement of the cams are shown in Fig. 2. *h* is the main depressing-cam. *i* is a self-acting wing-cam, provided with a stud or pin, *k*, which is pivoted in a hole in the cam-cylinder, so as to permit the free movement of the cam. *j* is a spring secured to the under side of the cam at one end, the other end being supported upon a pin, *t*, which is located back of the cam-pivot, so as to give the spring *j* a sliding movement, and as the pin *t* is located only slightly in rear of the pivot of the cam *i*, a strong spring can be used and be easily operated and greatly reduce the liability of getting out of order, and lessen the noise. *r* is a piece of metal secured to the inside of the cylinder, just above the cam *i*, so arranged as to form a passage for the heel of the needle between it and the cam *i*. On the opposite side of the main cam *h* is another wing-cam, *i'*, the same as *i*.

When knitting tubular work the heels of the needles will be carried up over the cam *i*, down one side of the depressing-cam *h* onto the circular ledge or cam *p*, thence up against the point of cam *i'*, which will be elevated, permitting the needles to pass onto the ledge *v*. When the motion of the cam-cylinder is reversed the needles will pass up over the cam *i'*, thence down along the edge of the cam *h*, thence to and up cam *p* to the point of the cam *i*, which will be elevated, and the needles will pass onto the ledge.

In knitting the heel of a stocking all the needles not wanted are to be raised up above the cam-cylinder, and will be held up by the loops. Then the cam-cylinder can be rotated first in one direction and then in the other, an additional needle being raised at each end for the purpose of narrowing. While this work is being done the cylinder must be rotated, so that the position of the yarn-carrier will be changed at each end of the work by the action of the heel of the needle upon the sliding bar *d*, as before described.

In knitting a continuous piece of straight work, the needles which are to act as stops can be held up by any suitable means, or a stop adapted to the purpose may be used. The wing-cams *i i'* will be held by the springs *j* in the position represented in Fig. 2, except when elevated by the action of the needles.

When the position of the yarn-carrier is changed from one end to the other of the bar *b*, there will be a little slack yarn, which should be taken up. Fig. 5 represents the device which I use to accomplish this result. E is a rod inserted at the proper place in the bed-plate C, as usual. F is an arm extending to a point over the center of the needle-cylinder. G is another arm or yarn-guide, through the end of which the yarn from the spool passes. H is a cloth-covered ring connected to the arm F. I is a spring-arm, having a hook, J, at the outer end. When knitting the heel of a stocking the yarn passes from the spool through the end of G, thence through the ring or eye H, thence over the hook J, thence through the end of F to the yarn-carrier D. The friction between the yarn and the cloth-covered ring H produces sufficient tension to prevent the yarn being drawn from the spool when taking up the slack, so that the action of the spring-arm I will be upon the slack yarn at the yarn-carrier. The ring H should be covered with woolen or other similar rough-surfaced cloth.

There are several well-known devices for preventing the cam-cylinder from slipping out of place while in use, none of which is shown.

By leaving the top of the cam-cylinder open I am enabled to locate the shifting devices, &c., above it, and greatly simplify the construction of the machine and also its operation.

I do not claim broadly the use of a needle-heel as a stock for shifting.

What I claim as new, and desire to secure by Letters Patent, is—

1. The combination of the needle-cylinder with the cam-cylinder open at the top above the ledge *v*, so that the needle-cylinder, with the needles therein, may be withdrawn from the cam-cylinder, substantially as shown and described.

2. The combination of the needle-cylinder, the cam-cylinder cut away at *g*, and the retaining-wire *f*, whereby the needle-cylinder, with the needles therein, may be withdrawn from the cam-cylinder and the needles held in place, substantially as described.

3. The combination of the cam-cylinder cut away at *g*, and the needle-cylinder provided with the retaining-wire *f*, placed above the cams, so that the needles may be elevated directly to a plane above the cams, and at the same time held in place by said retaining-wire, substantially as set forth.

4. The combination of the needle-cylinder and needles with the cam-cylinder, cut away at *g*, and with the sliding bar and the thread-carrier, the combination being substantially as described, and so that the butts of the needles may be drawn above the cam-cylinder and actuate the sliding bar and thread-carrier, as set forth.

5. The cams *i i'*, with their connected springs *j j*, in combination with the pins *t*, all arranged within the cam-cylinder, and constructed and operating as described.

6. The combination of the sliding bar *d* with the slotted bar *b* and carrier D, substantially as specified.

7. The combination of the springs *e* with the slotted bar *b*, sliding bar *d*, and carrier D, for holding said carrier in position at either end of the bar *b*, substantially as described.

8. The protector *a*, in combination with the carrier D, sliding bar *d*, and slotted bar *b*, for holding the bar *d* in position, substantially as specified.

JAMES L. BRANSON.

Witnesses:
JOHN C. EGLY,
C. MCGLATHERY.